US012712999B2

(12) United States Patent
Cantero Clares et al.

(10) Patent No.: US 12,712,999 B2
(45) Date of Patent: Aug. 18, 2026

(54) 3D DISPLAY METHOD AND ELECTRONIC DEVICE USING THE SAME

(71) Applicant: Acer Incorporated, New Taipei City (TW)

(72) Inventors: Sergio Cantero Clares, New Taipei City (TW); Shih-Hao Lin, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 0 days.

(21) Appl. No.: 18/745,628

(22) Filed: Jun. 17, 2024

(65) Prior Publication Data

US 2025/0385999 A1 Dec. 18, 2025

(51) Int. Cl.

*H04N 13/359* (2018.01)
*H04N 13/268* (2018.01)
*H04N 13/398* (2018.01)

(52) U.S. Cl.

CPC ......... *H04N 13/359* (2018.05); *H04N 13/268* (2018.05); *H04N 13/398* (2018.05)

(58) Field of Classification Search

CPC ... H04N 13/359; H04N 13/268; H04N 13/398
USPC .......................................................... 348/51
See application file for complete search history.

(56) References Cited

U.S. PATENT DOCUMENTS

2011/0141247 A1* 6/2011 Bai ...................... H04N 13/361 348/54
2012/0033039 A1* 2/2012 Sasaki .................. H04N 13/161 348/E13.001
2013/0169769 A1* 7/2013 Lee .................. H04N 21/44008 348/51
2013/0314514 A1* 11/2013 Mochinaga .......... H04N 13/332 348/54
2014/0313298 A1* 10/2014 Usukura ................ G02B 30/31 348/59
2022/0311990 A1* 9/2022 Makinen ................ H04N 13/31
2024/0169606 A1* 5/2024 Minegishi .............. G06T 11/00

FOREIGN PATENT DOCUMENTS

JP 2009147669 A * 7/2009 ............. H04N 7/173
JP 2013070267 A * 4/2013 ............. H04N 13/30
JP 2015173339 A * 10/2015 ............. H04N 5/74
RU 2452128 C2 * 5/2012 ............. H04N 19/12
TW 201342814 A 10/2013
TW 202209874 A 3/2022

* cited by examiner

*Primary Examiner* — Behrooz M Senfi
(74) *Attorney, Agent, or Firm* — Birch, Stewart, Kolasch & Birch, LLP

(57) ABSTRACT

A 3D display method and an electronic device are provided. The 3D display method includes the following steps: detecting whether a pattern is in a video; decoding a pattern information in the pattern, if the pattern is detected in the video; applying a decoded setting according to the pattern information; determining whether the video has side-by-side content according to the pattern information; and presenting the side-by-side content, if the video has the side-by-side content.

20 Claims, 6 Drawing Sheets

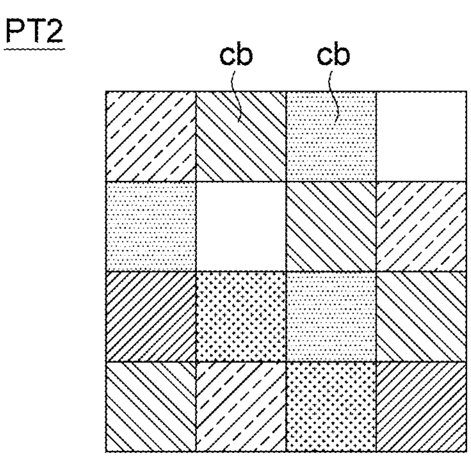
FIG. 3
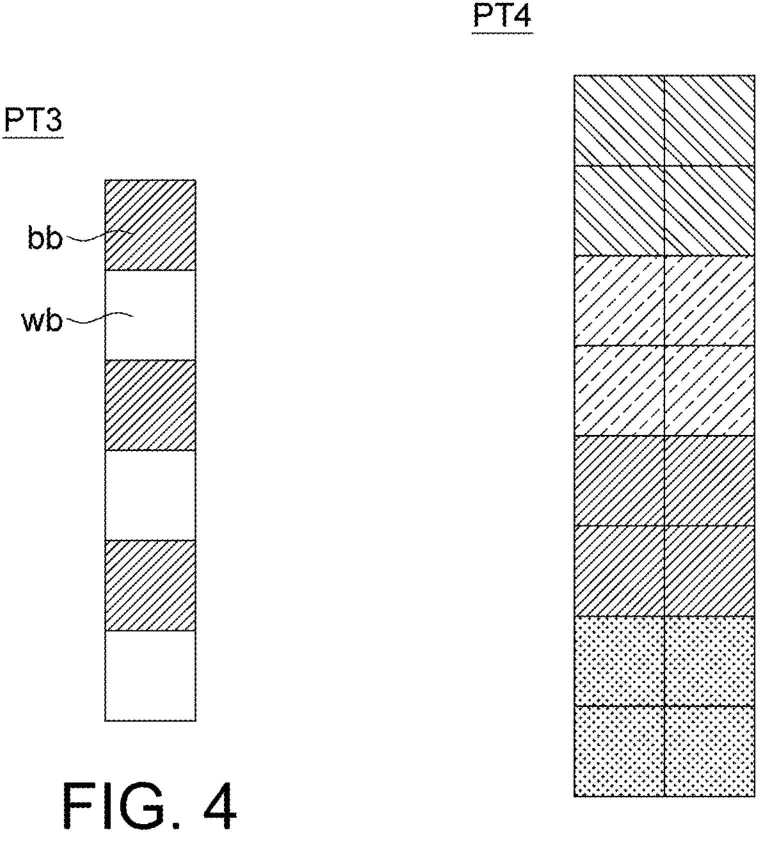
FIG. 4
FIG. 5

3D DISPLAY METHOD AND ELECTRONIC DEVICE USING THE SAME

TECHNICAL FIELD

The disclosure relates in general to a processing method and a device using the same, and more particularly to a 3D display method and an electronic device using the same.

BACKGROUND

In current retail demo experience, the manufacturer could create a video that will be played automatically and introduce the device features to the future buyer. However, in 3D displays, the video can be presented as a flat 2D image (as ordinary displays), as a 3D scene by weaving side-by-side (SBS) content or as a 3D scene with Acer's 2D to 3D conversion. In general use, this behavior is chosen by the user depending on the content. This is not an ideal situation in a demo experience, as the user is not familiar yet with the device. Alternatively, an AI model could be trained to detect whether a source image is 2D or SBS. However, the decision to convert to 3D or keep as 2D content is still necessary.

SUMMARY

The disclosure is directed to a 3D display method and an electronic device using the same. An un-intrusive pattern design applied to the video that is parsed by the 3D display software is provided to automate the experience.

According to one embodiment, a 3D display method is provided. The 3D display method includes the following steps: detecting whether a pattern is in a video; decoding a pattern information in the pattern, if the pattern is detected in the video; applying a decoded setting according to the pattern information; determining whether the video has side-by-side content according to the pattern information; and presenting the side-by-side content, if the video has the side-by-side content.

According to another embodiment, an electronic device is provided. The electronic device includes a display unit, a pattern detection unit and a side-by-side detection unit. The display unit is configured to display a video. The pattern detection unit is configured to detect whether a pattern is in the video; decode a pattern information in the pattern, if the pattern is detected in the video; and apply a decoded setting according to the pattern information. The side-by-side detection unit is configured to determine whether the video has side-by-side content according to the pattern information; and present the side-by-side content, if the video has the side-by-side content.

BRIEF DESCRIPTION OF THE DRAWINGS

FIG. 3 shows a pattern according to one embodiment of the present specification.

FIG. 4 shows a pattern according to one embodiment of the present specification.

FIG. 5 shows a pattern according to one embodiment of the present specification.

Figure 1:
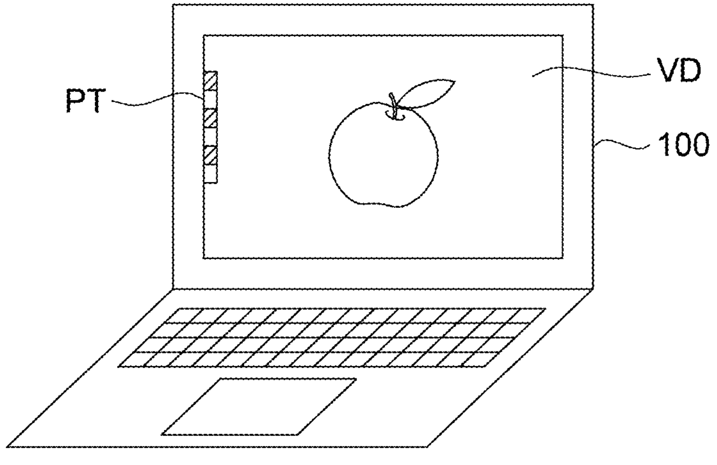
FIG. 1 shows an electronic device configured to show a video according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please referring to FIG. 1, shows an electronic device 100 configured to show a video VD according to one embodiment of the present disclosure. An idea presented in the present disclosure focuses on demo scenarios such as product launches, technology showcase or retail demonstrations. In such scenarios, we would like to guarantee the behavior of the system is correct every single time it executes and does not depend on user behavior. For this reason, an un-intrusive pattern design applied to the video VD that is parsed by the 3D display software is provided to automate the experience.

Letting the user change the behavior of the 3D display content is not ideal. On the other hand, automated detection using AI has a non-zero chance to fail and may make the demo content creation process longer as we cannot predict when the automated detection will fail. Due to these two limitations, we propose using a pattern PT to encode the desired behavior. This pattern PT will be parsed as the video VD is being played to determine the behavior of the 3D display software.

As shown in the FIG. 1, the pattern PT is, for example, disposed at a side area of the video VD. The pattern PT is disposed at identical location in a plurality frames of the video VD.

Figure 2:
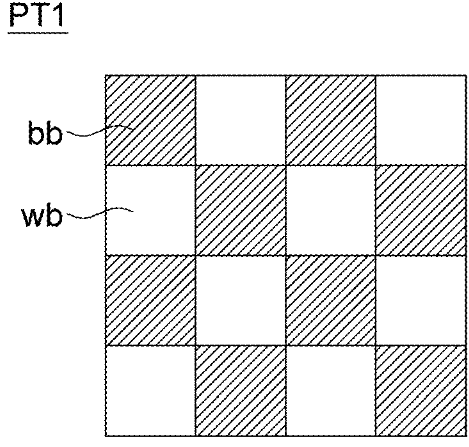
FIG. 2 shows a pattern according to one embodiment of the present specification.

Please refer to FIG. 2, which shows a pattern PT1 according to one embodiment of the present specification. The pattern PT1 includes, for example, a plurality of black blocks bb and white blocks wb. The pattern PT1 is a matrix.

Please refer to FIG. 3, which shows a pattern PT2 according to one embodiment of the present specification. The pattern PT2 includes, for example, a plurality of color blocks cb. The pattern PT2 is a matrix.

Please refer to FIG. 4, which shows a pattern PT3 according to one embodiment of the present specification. The pattern PT3 includes, for example, a plurality of black blocks bb and white blocks wb. The pattern PT3 is a strip.

Please refer to FIG. 5, which shows a pattern PT4 according to one embodiment of the present specification. The pattern PT4 includes, for example, a plurality of color blocks cb. The pattern PT4 is two strips.

Because the pattern PT is located at the edge area of the video VD, it is not easy for users to notice the existence of pattern PT.

Figure 6:
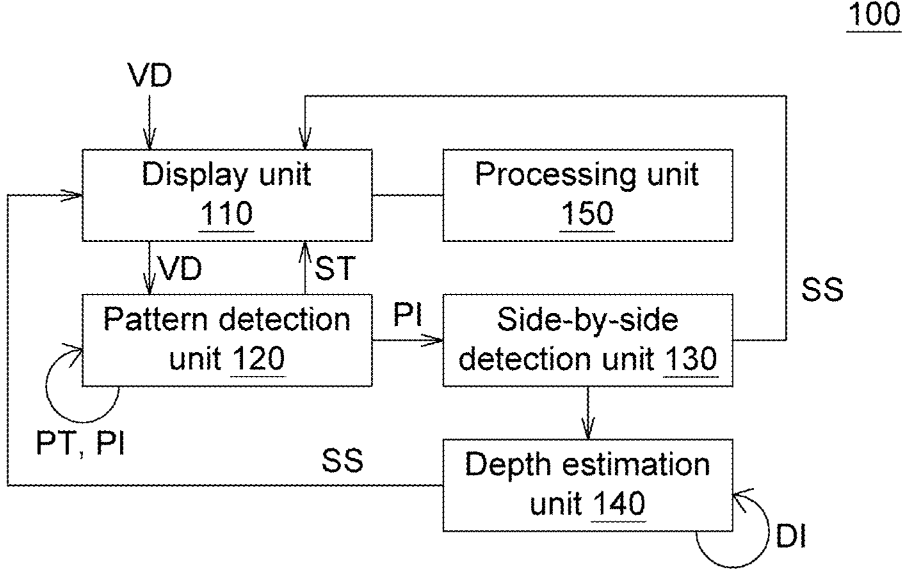
FIG. 6 illustrates a block diagram of the electronic device according to one embodiment of the present disclosure.

Please refer to FIG. 6, which illustrates a block diagram of the electronic device 100 according to one embodiment of the present disclosure. The electronic device 100 includes a display unit 110, a pattern detection unit 120, a side-by-side detection unit 130, a depth estimation unit 140 and a processing unit 150. The display unit 110 is, for example, a 3D display or a 2D display. The pattern detection unit 120, the side-by-side detection unit 130, the depth estimation unit 140 and the processing unit 150 are used to perform varied processing procedure. The pattern detection unit 120, the side-by-side detection unit 130, the depth estimation unit 140 and/or the processing unit 150 is, for example, a circuit, a circuit board, a storage device storing program codes or a chip. The chip is, for example, a central processing unit (CPU), a programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), an embedded system, a field programmable gate array (FPGA), other similar element or a combination thereof. Those elements are used to perform a 3D display method. The 3D display method is illustrated via a flowchart as follows.

Figure 7A:
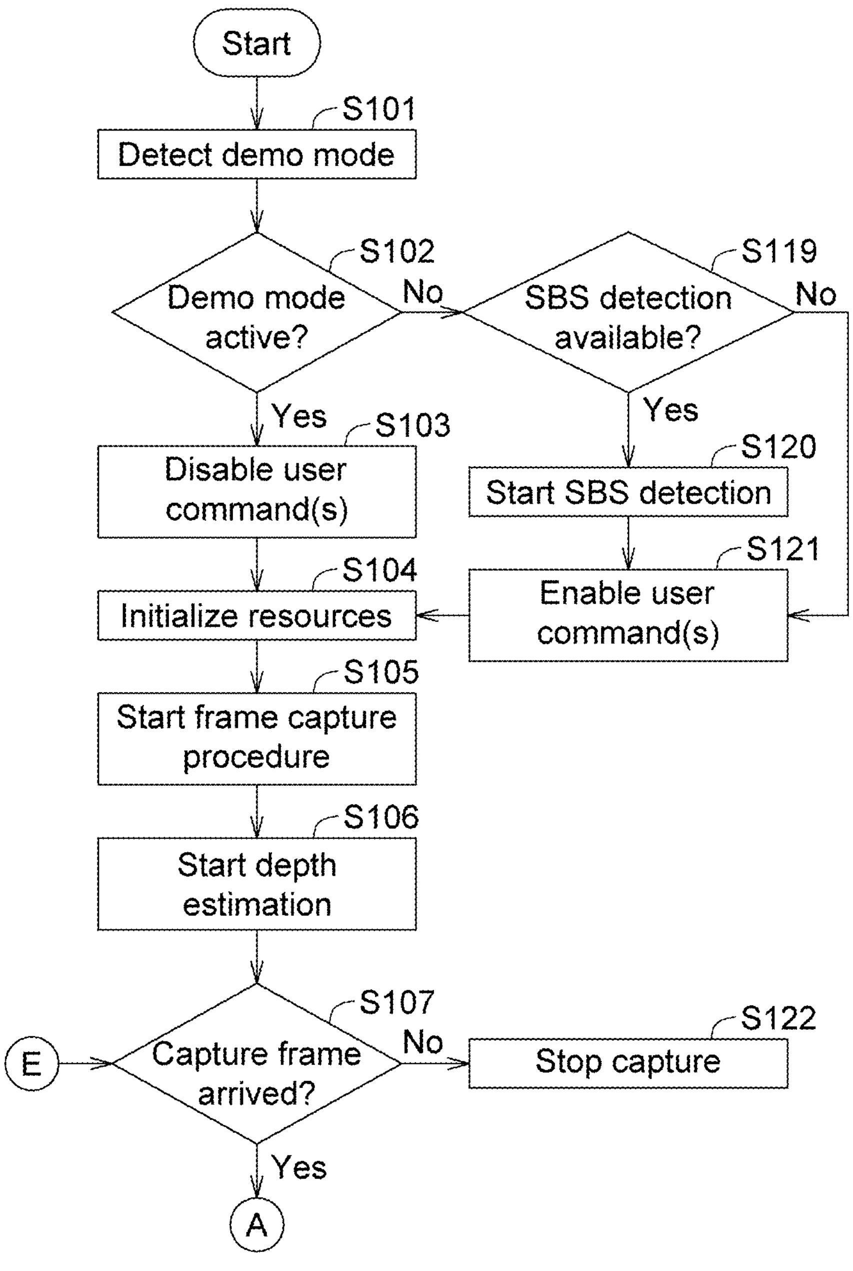
FIGS. 7A to 7C show a flowchart of the 3D display method according to one embodiment of the present disclosure.
Figure 7B:
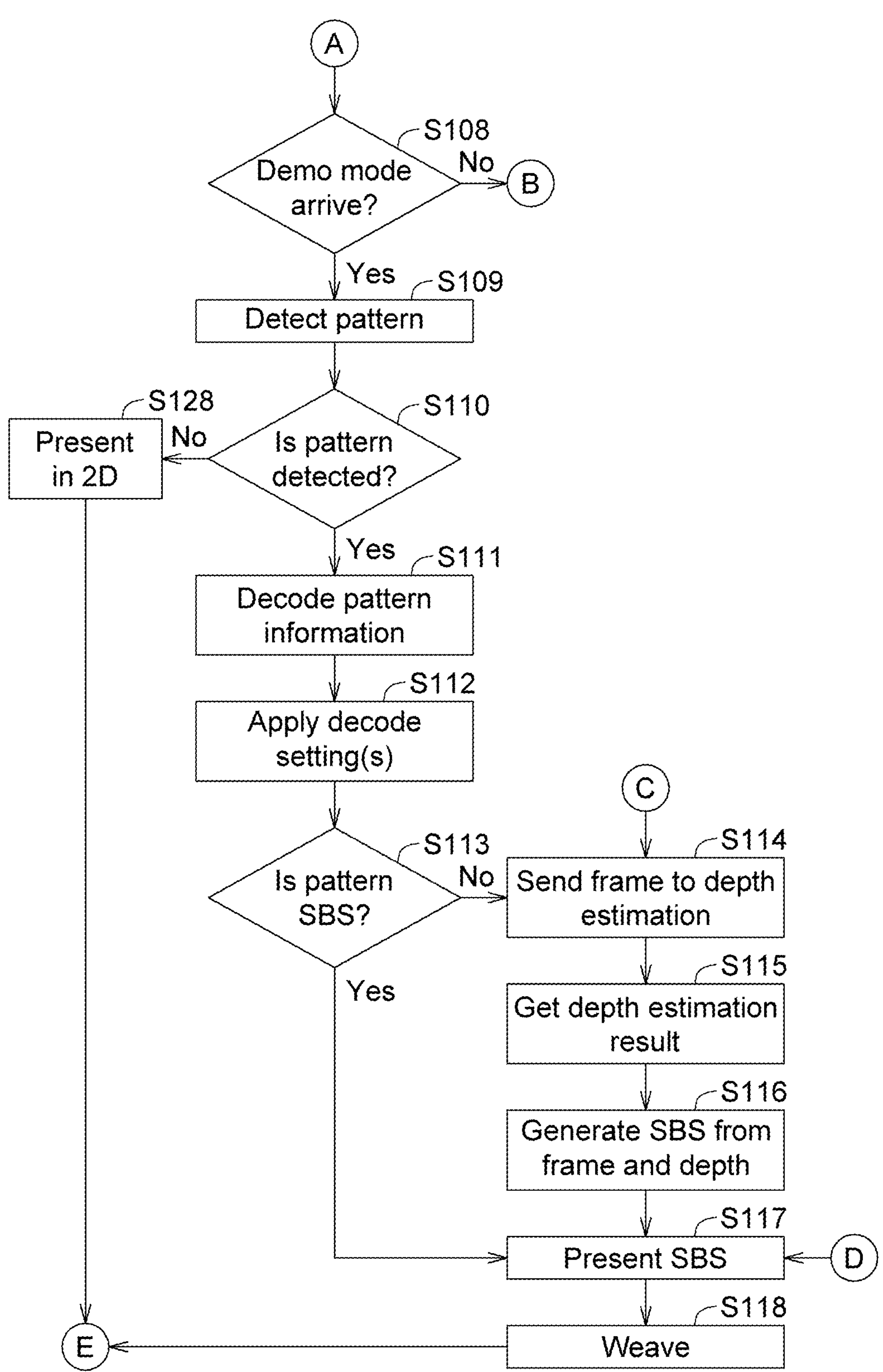
Figure 7C:
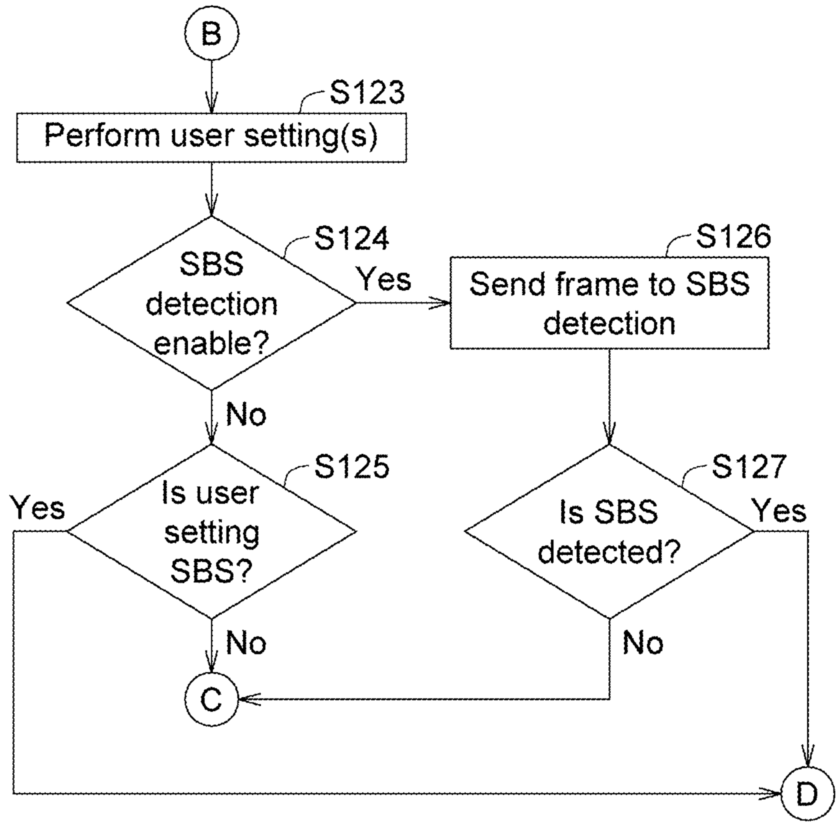

Please refer to FIGS. 7A to 7C, which show a flowchart of the 3D display method according to one embodiment of the present disclosure. In the step S101, the processing unit 150 detects the demo mode. In the step S102, whether the demo mode is active is determined. If the demo mode is active, the process proceeds to the step S103; if the demo mode is not active, the process proceeds to the step S119.

In the step S119, the processing unit 150 determines whether the side-by-side (SBS) detection is available. If the side-by-side detection is available, the process proceeds to the step S120.

In the step S120, the side-by-side detection unit 130 starts to perform the side-by-side detection.

Then, in the step S121, the processing unit 150 enable the user command(s).

Next, the process proceeds to the step S104.

In the step S103, the processing unit 150 disable one or more user command(s).

Then, in the step S104, the processing unit 150 initializes the resources.

Next, in the step S105, the processing unit 150 controls the electronic device 100 to start the frame capture process.

Afterwards, in the step S106, the processing unit 150 controls the electronic device 100 to start the depth estimation process.

Next, in the step S107, the processing unit 150 determines whether the captured frame is arrived. If the captured frame is arrived, the process proceeds to the step S108; if the captured frame is not arrived, the process proceeds to the step S122.

In the step S122, the processing unit 150 controls the electronic device 100 to stop the capture.

In the step S108, the processing unit 150 determines whether the demo mode is active. If the demo mode is active, the process proceeds to the step S109; if the demo mode is not active, the process proceeds to the step S123.

In the step S109, the pattern detection unit 120 detects the pattern PT in the video VD.

Next, in the step S110, the pattern detection unit 120 determines whether the pattern PT is in the video VD. If the pattern PT is in the video VD, the process proceeds to the step S111; if the pattern PT is not in the video VD, the process proceeds to the step S128.

In the step S128, the display unit 110 displays the video VD in 2D process.

In the step S111, the pattern detection unit 120 decodes a pattern information PI in the pattern PT.

Next, in the step S112, the pattern detection unit 120 applies a decoded setting ST according to the pattern information PI.

Then, in the step S113, the side-by-side detection unit 130 determines whether the video VD has the side-by-side content SS according to the pattern information PI. If the video VD has the side-by-side content SS, the process proceeds to the step S117; if the video VD does not have the side-by-side content SS, the process proceeds to the step S114.

In the step S114, one or more frame(s) is/are sent to the depth estimation unit 140.

Then, in the step S115, the depth estimation unit 140 performs the depth estimation according to the one or more frames to obtain a depth information DI.

Next, in the step S116, the depth estimation unit 140 generates the side-by-side content SS according to the depth information DI.

Then, in the step S117, the side-by-side detection unit 130 presents the side-by-side content SS.

Next, in the step S118, the video VD having the side-by-side content SS is waved by the display unit 110.

As shown in the FIG. 7C, in the step S123, the processing unit 150 performs the user setting(s).

Then, in the step S124, the processing unit 150 determines whether the SBS detection is enable. If the SBS detection is enable, the process proceeds to the step S126; if the SBS detection is not enable, the process proceeds to the step S125.

In the step S125, the processing unit 150 determines whether the user is setting SBS. If the user is setting SBS, the process proceeds to the step S117; if the user is not setting SBS, the process proceeds to the step S114.

In the step S126, the frames are sent to the SBS detection.

Next, in the step S127, the processing unit 150 determines whether the SBS is detected. If the SBS is detected, the process proceeds to the step S117; if the SBS is not detected, the process proceeds to the step S114.

According to the flowchart, after the next frame is received, whether the electronic device 100 is in the demo mode or the standard mode is detected first. In Windows retail demo experience (RDX), the operation system (OS) provides a method to determine the configuration. In any other scenario, a configuration file or key saved in the system could be used. The application data could be switched according to the user in charge of the demo mode. In the present disclosure, both of the demo mode and the standard mode are used to avoid the need to reinstall the software after the user has purchased the product and disabled Window's RDX mode.

In the standard mode, the display unit 110 will behave as determined by the user settings and user commands, as well as by AI detection algorithms if available. In the demo mode, the behavior is determined by the pattern PT and the parsing results. Note that to prevent accidental user commands from triggering, they are disabled in the demo mode. In addition, the program may only execute if the video content is playing by detecting if the media player is running.

There is one difference between the demo mode and the standard mode. Because it is assumed that the user is in control in the standard mode, there is no need to provide a 2D option. In the demo mode, however, it might be necessary to provide a 2D option for example, for transitions and other effects.

Let us now consider the case where a device has the application installed but is not connected to a 3D display. Due to the demo scenario being automated, the application will still run and parse the pattern PT. This could be solved by detecting if the 3D display is connected. However, the content may be the same. To solve this problem, the electronic device 100 will detect the 3D display on initialization and disable the depth estimation if it is not detected. If the result from the pattern detection or the SBS detection is shown that the video VD does not have the side-by-side content SS, the depth estimation will be kept and the image would not be presented, instead letting the user see the original video. This is the same if the pattern PT is not detected. Finally, if the result from the detection of the pattern detection or the SBS detection is that the video VD has the side-by-side content SS, the left image would be presented without weaving.

The pattern detection algorithm will read the pixels from either the corner or one or more sides of the captured frame. Each pixel will contain color information and a group of pixels with the same color information is considered a packet of data. This data could be defined as zeroes and ones only, as the pattern PT1 shown in the FIG. 2 and the pattern PT3 shown in the FIG. 4, or with many possible values. The pattern PT2 shown in the FIG. 3 has 6 different values and the pattern PT4 shown in the FIG. 5 has 4 different values defined.

The choice of values to use in encoding depends on multiple factors. The specific ordering and values are used to send not only the type of output desired, but also parameter data such as the 3D scene depth range, perspective, etc. If only the type of output is needed, a simple repeated pattern PT is sufficient. Such a simple pattern PT is easier to parse and less prone to errors due to different screen resolution and consequent interpolation, or due to video compression artifacts and data loss in the video creation process.

To avoid some of these sources of errors, the size of the data packets could be increased and read multiple pixels as one value. This will average the pixels and reduce the likelihood of one pixel affecting the result. However, the bigger the pattern PT, the more we need to crop the final image, otherwise the pattern PT will be visible and affect the experience. A repeated pattern PT on one or multiple sides is therefore preferred to a pattern PT in one or more corners.

Another method to reduce the visibility of the pattern PT is lowering the contrast and set the average color close to the background of the display. This way the pattern PT will look like the display itself and will not be distinguishable even if we do not crop the frame. However, detection thresholds need to be carefully chosen as this will be more affected by compression and interpolation artifacts.

In conclusion, the pattern PT, such as the pattern PT4 shown in the FIG. 5 is chosen for this application. The specific color values, order, and data packet size depends on the application. As the disclosure presented, there is a tradeoff between detection accuracy, visibility and how much information we can communicate to the pattern parser.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A 3D display method, comprising:

detecting whether a pattern is in a video, wherein the video includes a plurality of frames, part of each of the frames is replaced by the pattern and the pattern is embedded in each of the frames;

determining whether the video has side-by-side content according to the pattern which replaces part of each of the frames and is embedded in each of the frames; and presenting the side-by-side content, if the video has the side-by-side content.

2. The 3D display method according to claim 1, wherein the pattern includes a plurality of color blocks.

3. The 3D display method according to claim 1, wherein the pattern includes a plurality of black blocks and a plurality of white blocks.

4. The 3D display method according to claim 1, wherein the pattern is disposed at an edge area of each of the frames.

5. The 3D display method according to claim 1, wherein the pattern is disposed at an identical location in the frames of the video.

6. The 3D display method according to claim 1, wherein the pattern is a strip.

7. The 3D display method according to claim 1, wherein the pattern is a matrix.

8. The 3D display method according to claim 1, further comprising:

obtaining the frames from the video;

performing a depth estimation according to the frames to obtain a depth information; and generating the side-by-side content according to the depth information.

9. The 3D display method according to claim 1, further comprising:

determining whether a demo mode is active; and performing a user setting, if the demo mode is not active.

10. The 3D display method according to claim 1, further comprising:

determining whether a demo mode is activate; and disabling a user command, if the demo mode is activate.

11. An electronic device, comprising:

a display unit, configured to display a video;

a pattern detection unit, configured to detect whether a pattern is in the video, wherein the video includes a plurality of frames, part of each of the frames is replaced by the pattern and the pattern is embedded in each of the frames; and a side-by-side detection unit, configured to determine whether the video has side-by-side content according to the pattern which replaces part of each of the frames and is embedded in each of the frames; and control the display unit to present the side-by-side content, if the video has the side-by-side content.

12. The electronic device according to claim 11, wherein the pattern includes a plurality of color blocks.

13. The electronic device according to claim 11, wherein the pattern includes a plurality of black blocks and a plurality of white blocks.

14. The electronic device according to claim 11, wherein the pattern is disposed at an edge area of each of the frames.

15. The electronic device according to claim 11, wherein the pattern is disposed at an identical location in the frames of the video.

16. The electronic device according to claim 11, wherein the pattern is a strip.

17. The electronic device according to claim 11, wherein the pattern is a matrix.

18. The electronic device according to claim 11, further comprising:

a depth estimation unit, configured to obtain the frames from the video; perform a depth estimation according to the frames to obtain a depth information; and generate the side-by-side content according to the depth information.

19. The electronic device according to claim 11, further comprising:

a processing unit, configured to determine whether a demo mode is active; and perform a user setting, if the demo mode is not active.

20. The electronic device according to claim 11, further comprising:

a processing unit, configured to determine whether a demo mode is activate; and disable a user command, if the demo mode is activate.

* * * * *